United States Patent
Weitkamp (10) Patent No.: US 8,169,097 B2
(45) Date of Patent: May 1, 2012

(54) METHOD FOR OPERATING A WIND ENERGY INSTALLATION

(75) Inventor: Roland Weitkamp, Belm (DE)

(73) Assignee: Repower Systems AG, Hamburg (DE)

( * ) Notice: Subject to any disclaimer, the term of this patent is extended or adjusted under 35 U.S.C. 154(b) by 364 days.

(21) Appl. No.: 12/374,348

(22) PCT Filed: Jul. 5, 2007

(86) PCT No.: PCT/EP2007/005956
§ 371 (c)(1),
(2), (4) Date: Jan. 19, 2009

(87) PCT Pub. No.: WO2008/009354
PCT Pub. Date: Jan. 24, 2008

(65) Prior Publication Data
US 2010/0013227 A1    Jan. 21, 2010

(30) Foreign Application Priority Data
Jul. 21, 2006    (DE) .......................... 10 2006 034 251

(51) Int. Cl.
*H02P 9/04* (2006.01)
(52) U.S. Cl. .......................................... 290/44; 700/287
(58) Field of Classification Search .............. 290/43–44, 290/54–55; 416/1, 9; 700/287
See application file for complete search history.

(56) References Cited

U.S. PATENT DOCUMENTS

| | | | |
|---|---|---|---|
| 4,565,929 A * | 1/1986 | Baskin et al. .................... | 290/44 |
| 5,278,773 A | 1/1994 | Cousineau | |
| 5,283,708 A | 2/1994 | Waltz | |
| 6,783,326 B2 * | 8/2004 | Weitkamp et al. ................. | 416/1 |
| 6,925,385 B2 * | 8/2005 | Ghosh et al. ...................... | 702/14 |
| 6,946,750 B2 * | 9/2005 | Wobben .......................... | 290/44 |
| 7,013,203 B2 * | 3/2006 | Moore et al. ................... | 700/286 |
| 7,072,784 B2 * | 7/2006 | Wobben .......................... | 702/76 |
| 7,099,800 B2 * | 8/2006 | Henriksen et al. ............. | 702/187 |
| 7,181,316 B2 * | 2/2007 | Fairlie et al. .................. | 700/266 |

(Continued)

FOREIGN PATENT DOCUMENTS

CN    2632333 Y    8/2004

(Continued)

OTHER PUBLICATIONS

Heier, Siegfried; Windkraftanlagen: Systemauslegung, Netzintegration und Regelung; 4th Edition, B.G. Teubner, Stuttgart, Leipzig, Wiesbaden, Germany; Feb. 2005 (Discussed on Page 2 of Specification).

*Primary Examiner* — Michael Zarroli
(74) *Attorney, Agent, or Firm* — Rankin, Hill & Clark LLP (57) ABSTRACT

A method for the operation of a wind power plant (10), wherein in particular the wind power plant (10) will be or is switched off after a shutdown signal is triggered by a safety shutdown device (20) that is logically superordinate to an operating control system. The wind power plant (10) is released for operation by means of an operating device (41) that is spatially separated from the wind power plant (10) after a safety shutdown. An energy supply system with at least one wind power plant (10) and safety chain on a wind power plant are also described.

26 Claims, 4 Drawing Sheets

U.S. PATENT DOCUMENTS

| | | | |
|---|---|---|---|
| 7,318,154 B2 * | 1/2008 | Tehee, Jr. | 713/155 |
| 7,330,768 B2 * | 2/2008 | Scott et al. | 700/79 |
| 7,337,726 B2 * | 3/2008 | Wobben | 104/112 |
| 7,421,854 B2 * | 9/2008 | Shaffer et al. | 62/500 |
| 2002/0029097 A1 * | 3/2002 | Pionzio et al. | 700/286 |
| 2004/0236538 A1 | 11/2004 | Wobben | |
| 2005/0107989 A1 | 5/2005 | Henriksen et al. | |
| 2006/0163880 A1 * | 7/2006 | Wobben | 290/44 |
| 2006/0273595 A1 * | 12/2006 | Avagliano et al. | 290/44 |

FOREIGN PATENT DOCUMENTS

| | | |
|---|---|---|
| DE | 19948194 A1 | 4/2001 |
| DE | 20021970 U1 | 5/2001 |
| DE | 10115267 C2 | 10/2002 |
| DE | 10327344 A1 | 1/2005 |
| DE | 202005014629 U1 | 3/2006 |
| EP | 1764664 A2 | 3/2007 |
| JP | 2003-511657 A | 3/2003 |
| WO | 90/07823 | 7/1990 |
| WO | 01/77525 A1 | 10/2001 |
| WO | 02/053910 A1 | 7/2002 |
| WO | 02/079646 A1 | 10/2002 |
| WO | 2004/111443 A1 | 12/2004 |

* cited by examiner

METHOD FOR OPERATING A WIND ENERGY INSTALLATION

BACKGROUND OF THE INVENTION

1. Field of the Invention

The invention relates to a method for the operation of a wind power plant, wherein in particular the wind power plant will be or is shut down after a shutdown signal is triggered by a safety shutdown device that is logically superordinate to an operating control system. The invention also relates to an energy supply system with at least one wind power plant. Moreover, the invention relates to a safety chain of a wind power plant and a wind power plant.

2. Description of Related Art

As a general rule, a generic wind power plant has a rotor, at least one angle-adjustable rotor blade, a mechanical brake device for braking the rotor and an operating control device and a safety system.

The mechanical brake device engages, in the case of a wind power plant with gearbox on the quickly rotating side of the drive train. The generator with its rotating part called a runner is also located on this side. The mechanical brake device can also be arranged on the slow side of the drive train, i.e. on the side between the gearbox and rotor blades. But the wind power plant can also be designed without a gearbox so that the brake engages in the area of the rotor hub or the generator runner. Within the framework of the invention, the term rotor refers, in particular, to the terms drive train, fast shaft, generator runner, gearbox, rotor shaft (=slow shaft), rotor hub and rotor blades. A braking of the rotor means, in particular, the braking of the drive train.

Methods for the operation of a wind power plant and wind power plants are generally known. One such example is the textbook entitled "Windkraft Systemauslegung, Netzintegration und Regelung" (Wind Power System Design, Grid Integration and Control), Siegfried Heier, 4$^{th}$ Edition, B. G. Teubner, February 2005.

The operation of wind power plants and wind power plants themselves is critical in terms of their design, in particular with respect to security concerns. In particular in the case of strong winds in connection with a network outage, in which the aerodynamic torque created by the wind in the rotor meets no resistance from the generator, it can lead to extreme tower loads, in particular tower foot bending torques, uncontrolled blade angle adjustments and, if necessary, even the triggering of a safety chain. Due to the failure of the network or more generally due to a load rejection of the generator, the rotor begins to accelerate in strong wind until the brake system of the wind power plant begins to brake the rotor. Depending on the strength of the brake power, loads of varying strengths are exerted on the wind power plant.

Moreover, a wind power plant has a safety concept and a corresponding safety system. The safety concept hereby includes all devices, modes of operation and handling instructions that ensure that a wind power plant remains in a safe state even when malfunctions occur and the operating control system fails.

The safety system of a wind power plant has devices that are logically superordinate to the operating control system. Overall, the safety system cannot be deactivated by an unwanted intrusion or an accidental operation. The system is activated when safety-relevant threshold values are exceeded or the operating control system loses management of the wind power plant, whereby the unit cannot be maintained in the operating range. The safety system also includes devices that prevent an unwanted startup of the wind power plant, e.g. for maintenance work or suchlike.

The safety system usually also includes a safety chain, wherein the safety chain is a central device of the wind power plant. When a safety-relevant threshold value is exceeded, the protection devices are triggered by the safety chain, regardless of the operating control system. Protection devices in this connection are the aerodynamic and/or the mechanical brake system, the devices for network separation of the generator or of the generator/converter system and the emergency shutdown protection devices or safeguards and the main switch.

Moreover, a safety device for a wind power plant is known from DE-U-20 2005 014 629. Furthermore, a method for the monitoring of a wind power plant and a wind power plant are disclosed in DE-C-101 15 267.

The object of the present invention is to ensure the safe operation of a wind power plant, in particular after a safety shutdown triggered by a safety chain.

BRIEF SUMMARY OF THE INVENTION

The object is solved through a method for the operation of a wind power plant, wherein in particular the wind power plant will be or is shut down after a shutdown signal is triggered by a safety shutdown device that is logically superordinate to an operating control system, which is further characterized in that the wind power plant is released for operation after a shutdown by means of an operating device that is spatially separated or external from the wind power plant.

According to the invention, the timely restart of a wind power plant will be possible after a safety shutdown. The wind power plant hereby has a rotor with at least one rotor blade, a brake system with an auxiliary power supply and a safety system with a safety sensor system and at least one emergency shutdown switch and a control device with a memory for the recording of operating data. The control device is hereby connected with the operating device that is spatially separated or external from the wind power plant, for example in a remote monitoring control center, for the (re) start of the wind power plant. The connection between the wind power plant and the operating device, which is not part of the wind power plant or is not directly or immediately provided or arranged on the wind power plant, will or can be produced temporarily for a predetermined period of time, for example during the shutdown phase of the wind power plant. Of course, it is possible within the framework of the invention that the wind power plant is permanently connected with the operating device online in the remote monitoring control center.

Through the operating device according to the invention, a remote operation of the wind power plant is possible, wherein after a correspondingly positive check of all substantially important operating data that is available on the operating device or that is transmitted to the operating device after the safety shutdown, a restart of the wind power plant is initiated or triggered or started. For this, a remote monitoring control center, in which the operating device is located, is informed after a triggered safety shutdown, for example automatically.

The safety shutdown device is a device that is logically superordinate to the operating control system, which monitors compliance with safety-critical threshold values of the wind power plant independently of other operating controls and triggers a safety shutdown when one of these threshold values is exceeded. This is, in particular, required when the operating control system of the wind power plant during serious failures is not in the position to maintain the wind power plant in normal operating range. The safety shutdown device also keeps the wind power plant in a safe system state in the case of a failure of the operating control system.

A safety shutdown of a wind power plant can be triggered above all due to excess rotation speeds, vibrations, errors in the control hardware and/or control software and in the case of excess cable twisting in the tower head. For this, the safety chain on the wind power plant has, for example, a wired, in particular hard-wired switch, in which all contacts for the triggering of an "emergency off" of an emergency shutdown device or a "Safe off" of a safety shutdown are series-connected.

For the triggering of a "Safe off," the safety chain has contacts to an excess rotation speed switching device of the rotor and to the generator speed, a vibration switch, etc. The safety shutdown ensures that the wind power plant cannot be restarted without employees or operating personnel or maintenance personnel onsite, if there is a system-critical error.

For the triggering of an "Emergency off," emergency shutdown buttons are provided, for example, on the top box, in the rotor hub, in the vicinity of the rotor bearing and in the tower foot on the converter box and a service switch, which is used, for example, in the maintenance of the blade adjustment system.

After the safety chain is triggered, there is now the advantage according to the invention that the safety chain is reset via remote operation or remote control in the form of the operating device provided away from the wind power plant. A so-to-speak manual reset of the wind power plant hereby takes place from a distance, i.e. without manual contact with the wind power plant itself. The safety chain has, as is generally known, a corresponding sensor system or corresponding sensors for the excess rotation speeds, vibrations, control ("watch dog" function) and, if applicable, for cable twisting.

After the safety system has been triggered, the rotor can be braked, preferably in particular by passing over the operating control device. The operating control device can also be part of the safety system or the safety system can be part of the operating control device such that the operating control device does not necessarily have to be passed over for the braking after the safety system has been triggered.

Before restart after a safety shutdown, one or more test steps are executed in the remote monitoring control center. This preferably involves a reading of the error memory, a check that there are no people onsite (human safety), a visual outside inspection of the wind power plant through at least one camera and a visual inspection, in particular of the rotating parts of the drive cabinet, by means of at least one camera in order to ensure that all inner and outer unit components are in place and functional. This check must only be performed by a limited circle of experienced and authorized people in the remote monitoring control center, who have appropriate access rights to the operating data and to the operating device, wherein after a positive check of the operating data, the wind power plant is released for operation after the safety shutdown. It is ensured through the select access rights or the authorization of predetermined persons that a reset of the wind power plant is not performed by accident or by inexperienced persons.

Moreover, before the restart of the wind power plant, the blade adjustment systems are also checked as the primary and secondary braking system and their auxiliary power supplies (pitch batteries), wherein these checks can also be performed automatically by the operating control system. Optionally, it can also be ensured on the inside of the hub, for example with a pivotable camera, e.g. a web cam, that a blade adjustment is not just blocked or stiff due to loose hub components. Moreover, a check of the network parameters ensures that generated electrical power can be supplied to the network. The risk of excess rotation speed is, thus, virtually excluded.

A visual outside inspection of the wind power plant or its individual parts ensures a general integrity of the overall structure, in particular also of the rotor blades. This preferably takes place through a camera on a neighboring wind power plant. Alternatively, the observation can also take place through a camera fastened on the rear nacelle part or potentially also on an extension arm, wherein the rotor blades can then preferably be guided by slowly trundling the rotor through the visual range of the camera.

In particular, all rotating parts inside the nacelle, e.g. the rotor shaft or axle trunnions, in the case of gearbox machines the coupling to the gearbox and the gearbox output, the mechanical brake, the generator coupling, the generator and if applicable the generator gap as well as a slip ring unit, are visually inspected. Moreover, the structural integrity of other components in the nacelle is checked, such as control cabinets, transformers, converters, azimuth system, generator and gearbox cooler. If the power module is housed in the tower foot or in a separate transformer station, other cameras are also arranged there within the framework of the invention.

In a preferred embodiment, after a release of the wind power plant by the operating device, the rotating parts of the wind power plant are visually monitored during the slow restart of the drive train in order to identify potential imbalances or vibrations. In order to ensure a sufficiently high image transfer rate, an offline data transfer to the remote monitoring control center with the operating device may be required, so that operating data (below the rated speed) is recorded during a startup of the wind power plant. The machine is then shut down again or held in an uncritical state so that there is sufficient time for a transfer or assessment of the data in the remote monitoring control center. The wind power plant is only released for normal operation after another positive check.

In addition to a mass imbalance, the named monitoring measures also exclude an aerodynamic imbalance. Moreover, rough blade angle asymmetries are identified using the cameras installed in the hub, wherein finer asymmetries are excluded through software monitoring based on an actual value sensor system. A rough false position of the wind tracking can also be excluded through a camera pointed at the wind vane or by pivoting the existing outside camera to the wind measurement sensor system. An icing of the wind sensors or other damage to the wind sensors is also hereby excluded in a visual manner. Furthermore, excess cable twisting can be checked by means of the installed cameras or sensors and a cable end switch.

The advantages of the invention are that a standstill period after a safety shutdown is shortened by the safety chain, since the wind power plant is reset via remote monitoring or remote control by means of the operating device, without employees resetting the wind power plant manually onsite. This is particularly important if the safety chain was triggered through faulty activation, e.g. through a sensor error or a contact error. The remote reset even increases human safety since operating personnel onsite do not need to climb into the machine nacelle, which leads to further time delays, since this type of ascension takes a lot of time. Instead, the wind power plant is released without operating personnel having inspected the wind power plant onsite. Furthermore, the personnel in the remote monitoring control center are considerably more experienced in the assessment of the recorded operating data than the service personnel onsite, who primarily deal with maintenance and repair work.

If there was an analysis in the remote monitoring control center to determine that there is no wind power plant state that endangers the unit or its main components, the safety chain is reset via the operating device, wherein it is not possible to bypass the sensors of the safety chain. It is thus ensured that the safety chain can only be reset when all sensors are error-free.

In accordance with a preferred embodiment, it is provided that after the shutdown and before the release of the wind power plant, the wind power plant is checked based on pre-determined, in particular current, operating data about and/or from the wind power plant. The operability of the wind power plant is thereby checked. For this, the corresponding data or image data is preferably updated and transferred to the operating device. At the same time, the error memory on the wind power plant is also read in order to check the operating data.

In particular, the presence of persons on and/or in the wind power plant is checked after and/or during the shutdown of the wind power plant, so that the wind power plant is only released for operation after a safety shutdown if there are no people in the vicinity of or in the wind power plant. The detection of whether there are employees or operating personnel located onsite preferably takes place automatically. For this, motion sensors, proximity switches, door or hatch closure functions and switches are, for example, provided in the climb protection on the tower platforms and in the drivable unit. If it is determined based on the corresponding sensors that there are people in or on the wind power plant, it is not possible to release the unit for restart.

In a preferred embodiment, the release of the wind power plant is documented, wherein the documentation of the release takes place with date, time and error identification in the form of an error code and if possible with information for the authorized person who remotely reset the wind power plant after checking the safety-relevant data.

Moreover, it is preferred if the wind power plant is released for operation after the unlocking of an, in particular person-related and/or functional-error-related and/or hardware-related, security code. After entry of a corresponding security code on the operating device, access is only possible for a limited circle of expert people that have authorization to release a wind power plant after a safety shutdown. In this case, the security codes can be both person-related, i.e. that only specially authorized people can grant the release, and error-related, so that, after the detection of an error, the error can only be resolved via the then released operating device using a special security code.

The person-related security codes also include hardware-related embodiments, e.g. hardware dongle (copy protection plug) or key operated switches that can be inserted into the operating device.

Within the framework of the invention, it is also conceivable that several security codes or authorizations are present in the form of a hierarchy in order to increase security so that, for example, the unit is checked after a first authorization in the remote monitoring control center and only after a positive check is the entry of another authorization, perhaps by another person, required in order to restart the wind power plant.

It is suggested according to an advantageous embodiment that the operating device is notified after and/or during a shutdown of the wind power plant. A message is hereby automatically transmitted to the remote monitoring control center after a safety shutdown, wherein an error list for the error message can also be included. Within the framework of the invention, it is possible that this type of notification also takes place via appropriate wireless communication, e.g. SMS or suchlike.

It is provided in an advantageous further developed embodiment of the method that the number of releases of the wind power plant will be or is limited within a predetermined period of time so that another release is not possible after the releases have been exceeded within the period of time. This increases the safety of a wind power plant since, after the permissible number has been exceeded, the service personnel onsite must first perform an inspection or visual inspection of the wind power plant.

In order to further increase safety, an advantageous further developed embodiment provides that a check logic is saved in the operating control system that links the different aforementioned checks and only enables the remote reset if all checks were performed successfully and confirmed. In particular, one part of the required checks, e.g. the check of the network parameters or the state of the auxiliary power supply, can be performed automatically or semi-automatically by the operating control system. However, the remote reset is subsequently released essentially by a particularly competent person.

Moreover, the object is solved through an energy supply system with at least one wind power plant, which is further characterized in that an operating device that is, in particular, spatially separated from the wind power plant is provided such that the wind power plant will be or is released for operation by means of an operating device after a safety shutdown triggered by a safety shutdown device that is logically superordinate to an operating control system.

In particular, a locking device is provided on the wind power plant, wherein upon activation of the locking device a release of the wind power plant will be or is blocked by means of the operating device. The locking device on the wind power plant blocks active access of the operating device to the safety chain so that a reset of the safety chain or the safety shutdown can only be performed by the operating device after release by the locking device.

The locking device is preferably designed as a service switch. The locking device is designed as a service switch and serves so that the maintenance personnel onsite can ensure that a safety chain triggered for maintenance purposes onsite is not accidentally cancelled by a reset of the operating device. The service switch can also be designed as a "manual stop" switch, positioned, for example, in the tower foot and/or in the nacelle of the wind power plant, wherein the switch then includes the double function of "stopping the wind power plant" and "activating the locking device."

It is also preferred if upon activation of the locking device access of the operating device to the reset function of a safety chain and/or a safety system of the wind power plant will be or is blocked. In particular, the reset function of the safety chain or the safety system is blocked on the operating device. For this, a corresponding device for the blocking of the active access, in particular for the blocking of the reset of a safety shutdown, is provided on the operating device.

Alternatively, the activation of the locking device can also take place in that the maintenance personnel logs into the operating control computer in the wind power plant via a control terminal. This activation can occur, for example, from control terminals in the tower foot or in the nacelle of the wind power plant.

Another embodiment of the invention provides that in the case of a reset of the safety chain or a release by the operating device an acoustic and/or optical signal is emitted at the wind power plant. In particular in the areas visited by people for maintenance purposes, e.g. inside the tower, machine nacelle, rotor hub, this type of signal warns any potentially remaining personnel. Alternatively or additionally, a signal can also be sent to a receiver (wireless receiver, "beeper") that is generally carried by people in the area of the wind power plant. These measures minimize the risk to people from the wind power plant who were accidentally not detected by the aforementioned measures in the case of a remote reset.

Furthermore, according to the invention, the energy supply system is operated according to the method described above.

The object is also solved through a wind power plant, which is designed or equipped with a locking device described above, wherein upon activation of the locking device a release of the wind power plant by means of an operating device will be or is blocked after a safety shutdown by a safety chain or a safety system. A reset after a safety shutdown is thereby blocked. A reset or a release of the wind power plant is only possible after deactivation of the locking device.

Furthermore, the wind power plant or the energy supply system is further characterized in that after an activation of the locking device the operating device for the release of the wind power plant is or will be unlocked after entry of a password or transmission of an authorization. After a check of the important operating data of the unit by a particularly qualified employee, for example remotely, the wind power plant is released for restart remotely using a specially protected access right from predetermined experts in the case of the positive check of important operating data.

Additionally or alternatively, it can be provided in the case of the wind power plant or the energy supply system that after activation of the locking device after checking for the presence or absence of persons in and/or on the wind power plant and after determined absence of persons, the operating device is or will be unlocked for release of the wind power plant. The following steps are thereby performed: Check that there are no employees in and/or on the wind power plant and/or that no "Emergency off" has taken place,
check of, in particular important, operating data of the unit by a particularly qualified employee remotely in the remote monitoring control center and in the case of a positive check, remote release of the unit for restart.

The object is also solved in that a safety chain of a wind power plant is further characterized in that a reset switch is provided, which is or will be activated after triggering of a safety shutdown of the wind power plant by means of or in connection with an operating device that is spatially separated from the wind power plant, such that the wind power plant is released for operation after the safety shutdown.

According to the invention, a safety chain, through which a safety shutdown of the wind power plant takes place, thus has a type of remotely operated reset switch, which will be or can be switched in connection with the operating device in a remote monitoring control center so that, after a triggered safety shutdown, the restart of the wind power plant is released after several checks have been performed on the operating device in the remote monitoring control center to determine whether the wind power plant is in a function and error-free state.

The safety chain is also further characterized in that at least one manually activatable switch of an emergency shutdown device is provided such that after manual activation of the switch a safety shutdown of the wind power plant is triggered. Through the activation of a switch, live parts of the wind power plant are disconnected and/or a brake program for the rotor blades of the wind power plant is triggered. The safety shutdown by the emergency shutdown device is in particular triggered by operating personnel or maintenance personnel at a wind power plant. For this, there are several manually activatable switches, for example in the vicinity of rotating parts, in the top box, in the ground box, in the vicinity of the converter, etc. Moreover, a manually activatable switch is also a service switch designed as a key-operated switch, which effectuates a safety shutdown of the wind power plant with a key after manual rotation.

In accordance with a preferred embodiment, it is further suggested that at least one switch of a safety shutdown device that is activatable by a sensor is provided such that after activation of the switch a safety shutdown of the wind power plant is triggered.

Cable twisting is, for example, monitored using sensors. Furthermore, the vibration of the wind power plant is recorded as well as an excess rotation speed of the rotor and an excess rotation speed of the gearbox and the controller is recorded with the help of a "watch dog" for each sensor. In particular, parts of the machine are hereby monitored that could cause any damage to the nacelle.

Furthermore, the at least one switch of the emergency shutdown device or several switches of the emergency shutdown device and the at least one switch of the safety shutdown device or several switches thereof are in particular series-connected. This ensures secure operation of the safety chain. The safety chain preferably has several reset switches so that, in addition to the reset switch, which is switched by the operating device in the remote monitoring control center, at least one other reset switch is provided. Such reset switches can be manually or automatically activated. One example of an automatically activatable reset switch is the reset switch for the network return if the network of the wind power plant was disconnected for an otherwise error-free wind power plant.

Manual buttons as reset switches can, for example, be provided in the top box or in the ground box as well as at other locations in the wind power plant.

The reset switches are connected parallel with respect to each other in order to enable a reset of the safety chain from each reset switch independently.

Through the emergency shutdown device and/or the safety shutdown device, corresponding brake programs are triggered for the moving parts of the wind power plant. In order to ensure for reasons of safety a shutdown of the unit after the triggering of a safety shutdown or a corresponding switch also in the case of the failure of a relay, the emergency shutdown device and/or the safety shutdown device each preferably have at least two switch relays.

Furthermore, in accordance with one embodiment, a release of the wind power plant by the operating device is blocked in the case of an emergency shutdown by the emergency shutdown device. A remote reset is not possible after an emergency off until the "emergency off" is deactivated onsite.

Moreover, the safety chain is characterized in that, in the case of an emergency shutdown by the emergency shutdown device, the rotor is brought to a standstill by means of, in particular mechanical, brake devices and/or power is disconnected from the components. If technically possible, all components are preferably disconnected from the power supply.

In contrast, in the case of a safety shutdown by the safety shutdown device, the rotor is only brought into a low-load mode or state, in particular a trundle state, by brake devices.

In accordance with the invention, the emergency shutdown device and/or the safety shutdown device have a different form of safety shutdown: In the case of the safety shutdown, the unit is transferred to a safe unit state through the activation of the brake systems, in particular the blade adjustment. However, the rotor is not brought to a standstill, but rather remains in the low-load trundle state. Furthermore, not all systems are disconnected from the power, e.g. the wind tracking system remains active. Moreover, a remote reset according to the invention is possible after a corresponding check.

In the case of the emergency shutdown device, the mechanical brake device is also directly activated in order to bring the rotor to a complete standstill as quickly as possible. Furthermore, if possible, all components are disconnected from the power supply, i.e. systems like wind tracking are deactivated. The only exception is systems like the auxiliary-power-buffered blade adjustment, which must also be operated electrically when the safety chain is triggered, in order to move the rotor blades into the brake/feathering position.

The stepping of the two safety chain functions—emergency shutdown device and/or the safety shutdown device—is realized through the series connection with intermediate pickup by the emergency off relays.

An, in particular uninterruptible, power supply is also preferably provided for the safety chain, whereby a reliable operation of the wind power plant or the safety chain is attained.

It is also beneficial if the safety chain is designed as a wired, in particular hard-wired, switch. This measure ensures maximum security even after lightening strikes.

Furthermore, the object is solved through a wind energy unit, which is designed with a safety chain according to the invention described above.

The invention is described below, without restricting the general intent of the invention, based on exemplary embodiments in reference to the drawings, whereby reference is made expressly to the drawings with regard to the disclosure of all details according to the invention that are not explained in greater detail in the text.

DETAILED DESCRIPTION OF THE INVENTION

In the following figures, the same or similar types of elements or corresponding parts are provided with the same reference numbers in order to prevent the item from needing to be reintroduced.

Figure 1:
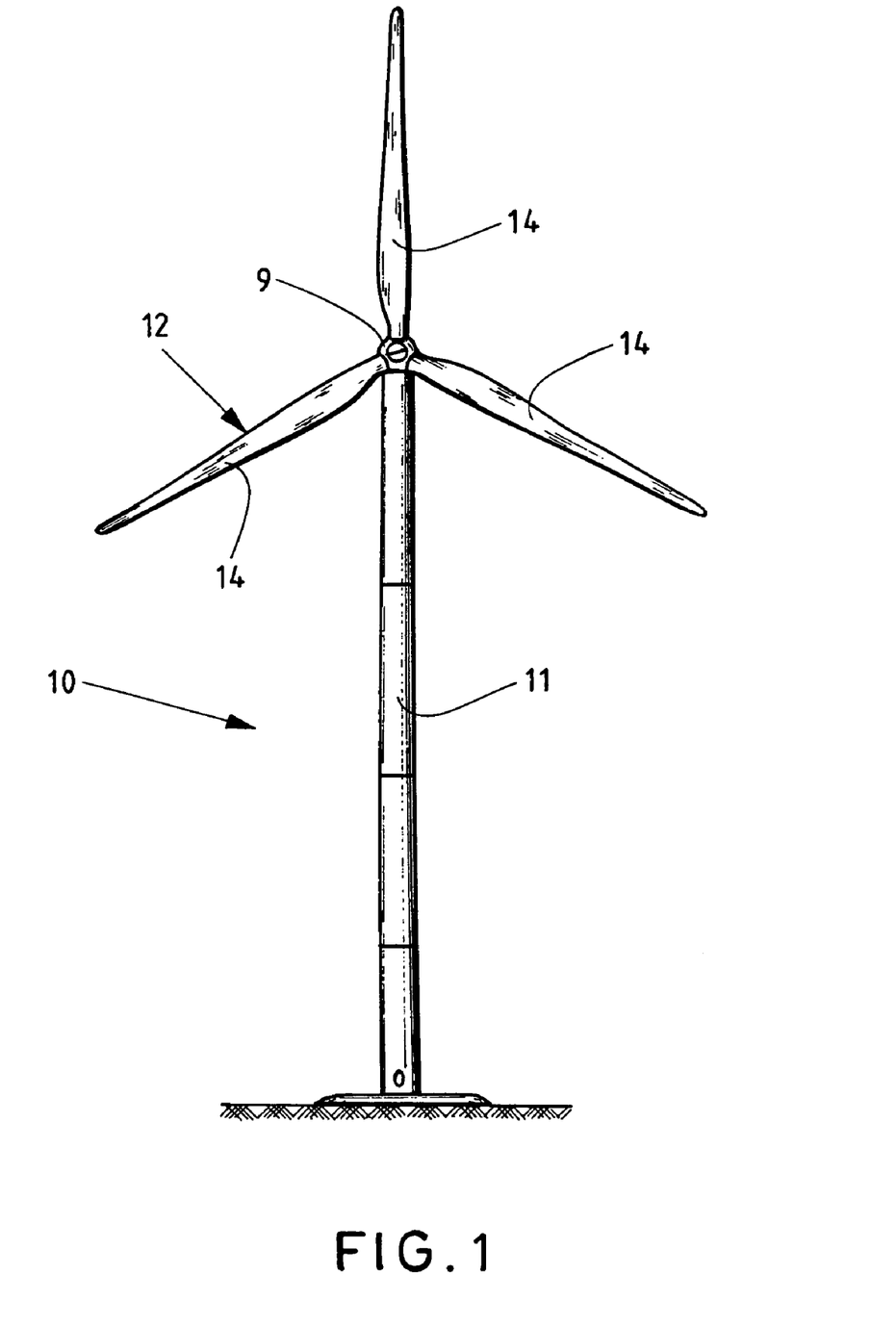
FIG. 1 shows a schematic representation of a wind power plant.

FIG. 1 shows a schematic representation of a wind power plant 10. The wind power plant 10 has a tower 11 and a rotor 12, which comprises three rotor blades 14, which are attached to a rotor hub 9. The rotor hub 9 is connected to a rotor shaft 13. When the wind blows, the rotor 12 turns in a known manner. Power from a generator connected to the rotor 12 or via the rotor hub 9 and the rotor shaft 13 can hereby be created and delivered to a consumer network.

Figure 2:
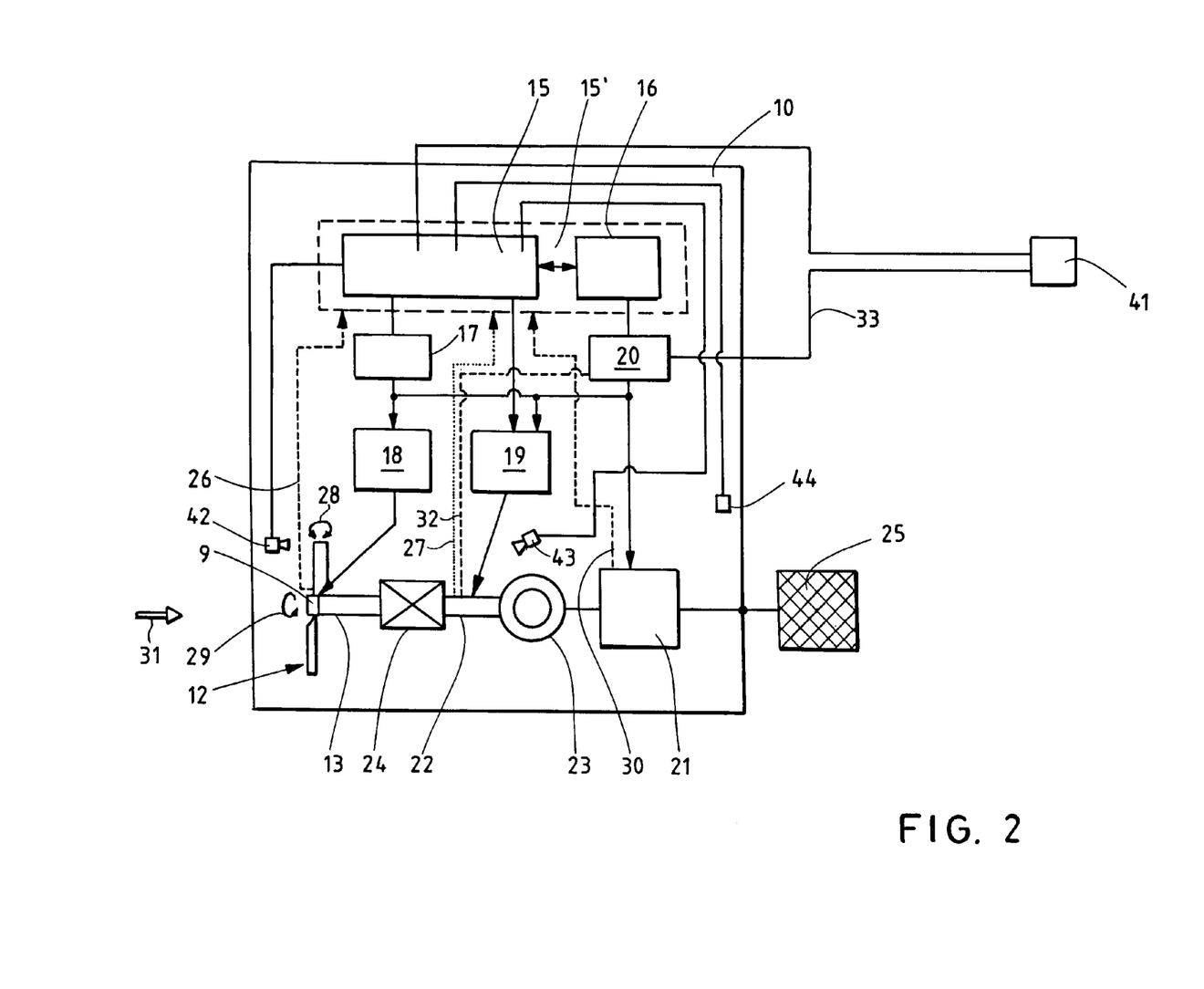
FIG. 2 shows a schematic block diagram of the main components of a wind power plant and
FIG. 3 shows a schematic circuit diagram of a safety chain.
Figure 4:
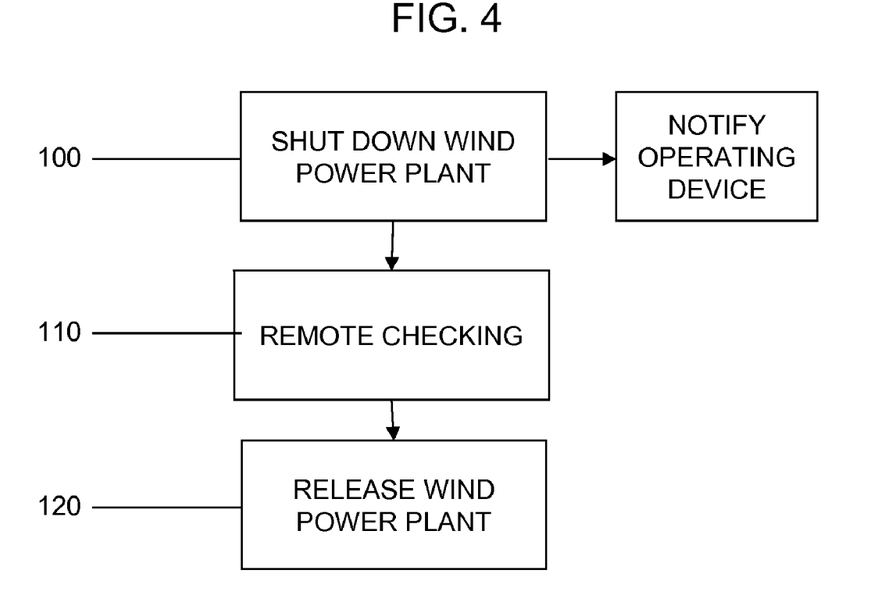
FIG. 4 shows a block diagram of a method of carrying out the invention.

FIG. 2 shows a schematic view of main components of the wind power plant 10. An operating control 15, which can also be called the operating control device or the operating control system, controls and/or regulates the operation of the wind power plant 10 and FIG. 4 a method of operation. Coordinate to the operating control 15 is a safety monitoring 16, which is connected with a safety chain 20. The safety chain 20 comprises, for example, a vibration detector, a manual (emergency off) switch and a rotation speed switch relay. The safety chain 20 serves to shutdown 100 the wind power plant to a non-critical state in the case of the occurrence of a safety-relevant event, for example for large vibrations or the activation of the emergency off switch by operating personnel. The safety chain 20 can be designed as a hardware chain.

In the case of the triggering of the safety chain 20, the generator 23 is removed from the network 25, which is indicated by the arrow to the electrical components 21 and the rotor shaft 13 or the fast shaft 22 is braked, for example via the blade adjustment 18 or the mechanical brake 19 or also, which is not shown, immediately bypassing one or more regulation or control devices such as the regulation device 17. This safety monitoring 16 can also be designed such that it checks the operating control 15 for functionality. The safety monitoring 16 is thus preferably designed as a type of watch dog. The operating control 15' can, as shown by the dashed line, also comprise the safety monitoring 16. This is then an operating control 15' with integrated safety monitoring 16.

Moreover, the safety chain 20 is connected with the operating control system or the operating control 15, 15', which will be or is connected with an external operating device 41 during a safety shutdown. The operating device 41 is located outside of the wind power plant 10, for example in a remote monitoring control center, operating device 41. After the triggering of a safety shutdown via the safety chain 20, a message is sent to the operating device 41, so that it is registered in the remote monitoring control center that the wind power plant has been shut down.

After the safety shutdown, a remote query of important operating parameters is performed so that it can be checked 110 based on this operating data whether a restart of the stopped wind power plant 10 is possible. For this, visual recordings of the operating control 15, 15' are transmitted to the operating device 41 via external cameras 42 on the nacelle or on a neighboring wind power plant or internal cameras 43.

Within the framework of the invention, it is possible that not just one but several cameras 42 are arranged outside the nacelle and inside the nacelle at safety-relevant locations, which transmit corresponding image data to the operating device 41. Based on the current operating data or image data, corresponding checks are performed by operating personnel in the remote monitoring control center, wherein appropriately authorized persons can grant a reset or a release 120 of the wind power plant 10 after a safety shutdown only after ascertainment of a properly operating wind power plant 10 and after entry of one or more corresponding security codes on the operating device 41.

Furthermore, it is determined by means of corresponding sensors on or in the wind power plant 10 whether there are people on or in the wind power plant 10. This type of sensor is indicated schematically in FIG. 2 and is provided with reference number 44. For example, sensor 44 is designed in the form of a movement sensor or suchlike and is connected to the operating control 15, 15'.

The operating control 15, 15' is connected with a controller 17 and the blade adjustment 18 and also with the mechanical brake 19 via corresponding electronic data lines. Blade adjustment 18 is in particular an actuator, which ensures the blade adjustment of the rotor blades 14. Accordingly, a mechanical brake 19 is an actuator, which makes sure that the mechanical brake 19 in this exemplary embodiment affects the fast shaft 22. The mechanical brake 19 can also affect the rotor shaft 13 but this is not shown.

Reference number 26 indicates a data connection, which conveys a rotor blade angle or the rotor blade angles of the rotor blades 14 to the operating control 15 or 15'. Reference number 27 shows a data connection, which conveys an actual rotational speed of the fast shaft 22 to the operating control 15 or 15'. Moreover, the shaft 22 or a sensor on the shaft 22 is connected with the safety chain 20 via a connection line 32, wherein a corresponding signal is transmitted from one sensor (not shown here) to the safety chain 20 after the detection of excess rotational speeds via the connection line. As a result, a safety shutdown of the wind power plant is for example triggered by the safety chain 20. Reference number 30 indicates a data line, which conveys an interference signal, which is emitted by electrical components 21 in this exemplary embodiment, to operating control 15 or 15'.

The communication of the operating device 41 with the cameras 42, 43 and the sensor 44 in or on the wind power plant takes place in the exemplary embodiment in FIG. 2 via the operating control 15, 15' or the operating control system. Alternatively, an additional communication device can also be present for this. Furthermore, direct communication could also take place between the cameras 42, 43 and the sensor 44 and the operating device 41.

After a safety shutdown has been triggered by the safety chain 20, a corresponding message or a signal is sent to the operating device 41 via the operating control 15. Alternatively, a direct connection line 33 can also be provided between the safety chain 20 and the operating device 41. Then the operating device 41 communicates with the operating control 15, 15' via the connection line 34 in order to receive current operating data or additional data from there, which can undergo a detailed assessment in the remote monitoring control center.

The wind power plant 10 operates as follows. The rotor 12 is turned according to the rotation direction 29 when the wind blows (reference number 31). The rotor shaft 9 thus also turns, which turns the fast shaft 22 with a gearbox 24 in a transmission ratio of 1:100, for example. This generates an electrical voltage in generator 23, which is regulated, converted and/or transformed into an alternating current voltage in the electrical components 21. At the outlet of the electrical components 21, a connection to the network 25 is provided, with which the consumers are supplied with voltage or electrical power. Generally known regulation and management concepts for wind power plants are, for example, disclosed in chapter 5 of the textbook entitled "Windkraftanlagen Systemauslegung, Netzintegration und Reglung" (Wind Power Plants, System Design, Grid Integration and Control) by Siegfried Heier, which is specified above.

Figure 3:
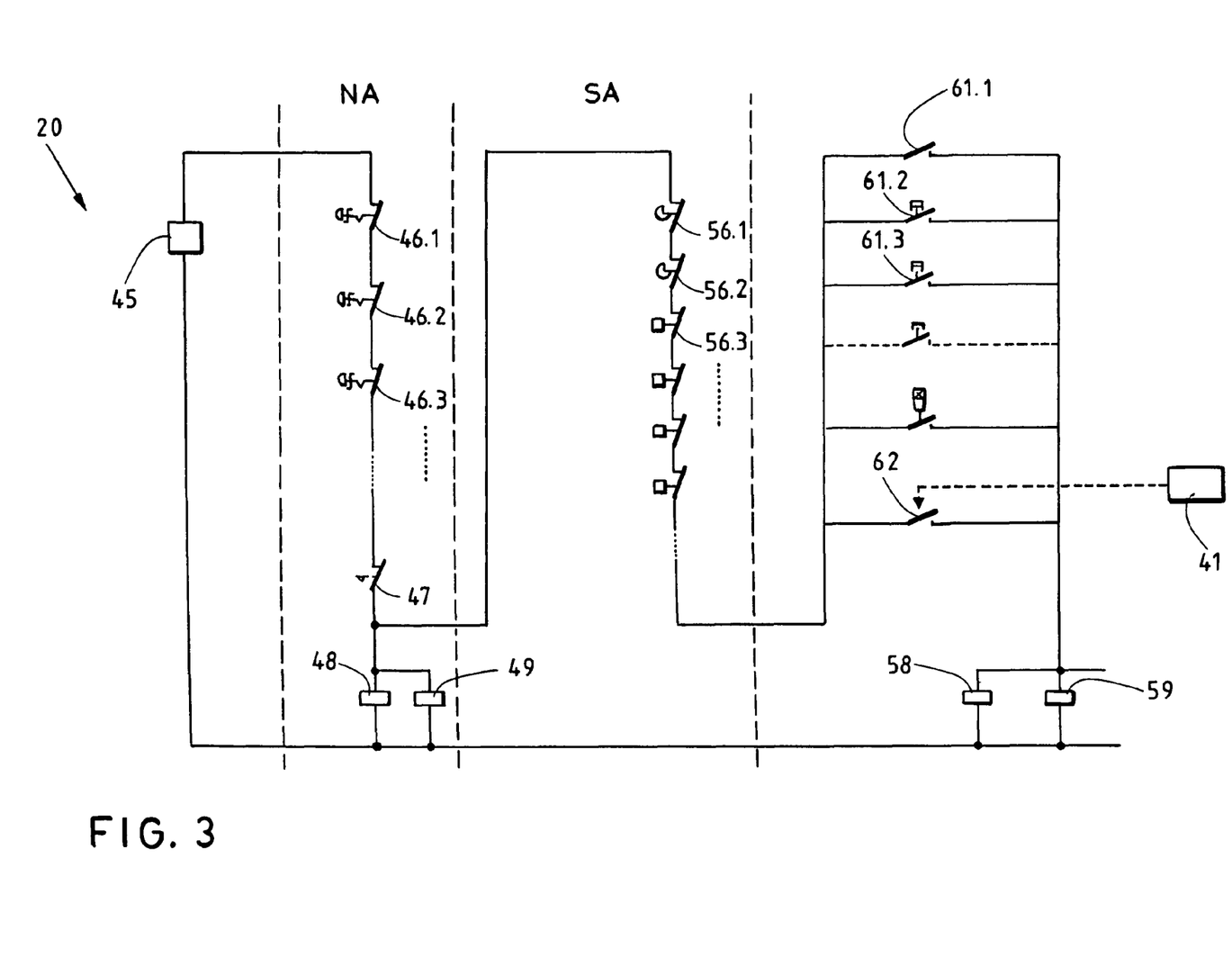

FIG. 3 shows a schematic representation of a safety chain 20, which is used in a wind power plant, that is disconnected from the power supply.

The safety chain 20 is a wired, in particular hard-wired, switch, which has an uninterruptible power supply 45. These types of so-called "UPSs" are known to a person skilled in the art. A battery can also be provided as a power supply, for example.

The series-connected manual switches 46.1, 46.2, 46.3, . . . , which are arranged as emergency off switches on the top box, on the ground box, in the tower foot and on the converter cabinet and at other locations on and in the wind power plant, are connected to the power supply 45 in the case of an emergency shutdown device NA. Moreover, another key-operated switch 47 is series-connected to the other manually activatable switches 46.1, 46.2, 46.3, . . . , which is activated by means of a corresponding key by maintenance personnel. This type of key-operated switch 47, also called a service switch, is for example provided in the top box (control cabinet in the nacelle) for the maintenance of the blade adjustment device.

The emergency shutdown device NA shuts down all live parts and all rotating parts. The live parts are disconnected from the power supply, if possible, upon activation of the emergency shutdown device NA. The switches are opened through activation of one of the switches 46.1, 46.2, 46.3, . . . , 47 so that a safety shutdown of the wind power plant takes place. This "emergency off" opens the connected relays 48, 49 (failsafe arrangement).

When the loop is interrupted, the self-holding relays 48, 49 fall so that a safety shutdown takes place. The relays 48, 49, for example, hereby control the brakes of the wind power plant and trigger e.g. a brake program.

Furthermore, additional switches 56.1, 56.2, 56.3, . . . of a safety shutdown device SA are series connected to the manually activatable switches 46.1, 46.2, 46.3, . . . , 47, wherein the switches of the safety shutdown device SA are switched by means of sensors. The sensors for the switches 56.1, 56.2, 56.3, . . . monitor moving parts or suchlike in the machine. For example, the cable twisting (clockwise and counter-clockwise) is monitored by means of two sensors. Moreover, a constant check of the vibration, the excess rotation speed of the rotor and the gearbox and a monitoring of the operating control system (watch dog) take place.

The self-holding relay 61.1 and various reset switches 61.2, 61.3, . . . are switched parallel to each other in series with respect to the switches 46.1, 46.2, 46.3, . . . , 47 and the other switches 56.1, 56.2, 56.3, . . . in order to enable the restart of the wind power plant after a safety shutdown by the emergency shutdown device NA or the safety shutdown device SA. Various reset switches 61.2, 61.3, . . . are provided for this. These reset switches 61.2, 61.3, . . . can be designed both as mechanically activatable switches at the appropriate locations, for example in a top box, in the ground box.

Moreover, there is also a reset switch for a network return. The self-holding switch 61.1 is closed during the proper operation of the wind power plant. FIG. 3 shows the safety chain 20 in a disconnected state.

As a further reset switch according to the invention, the safety chain 20 has a reset switch 62, which is switched remotely by means of the operating device 41 of a remote monitoring control center shown schematically in FIG. 3. A safety shutdown is performed through activation of the sensor-switched switches 56.1, 56.2, 56.3, . . . in that the relays 58, 59 fall so that according to the inventive concept the reset switch 62 is remotely activated after checking in the remote monitoring control center by means of the operating device 41, whereby the wind power plant 10 is restarted. The safety chain 20 is hereby reset when all sensors are error-free. The safety shutdown initiated by the safety shutdown device SA also executes corresponding brake programs for the parts of the wind power plant.

LIST OF REFERENCES

9 Rotor hub
10 Wind power plant
11 Tower
12 Rotor
13 Rotor shaft
14 Rotor blade
15 Operating control
15' Operating control with integrated safety monitoring
16 Safety monitoring
17 Controller
18 Blade adjustment
19 Mechanical brake
20 Safety chain 21 Electrical components
22 Fast shaft
23 Generator (with runner and stator)
24 Gearbox
25 Network
26 Data connection
27 Data connection
28 Angle adjustment
29 Rotation direction
30 Interference signal
31 Wind
32 Connection line
33 Connection line
34 Connection line
41 Operating device
42 Camera
43 Camera
44 Sensor
45 Power supply
46.1, 46.2, 46.3 Switch
47 Key-operated switch
48 Relay (emergency off)
49 Relay (emergency off)
56.1, 56.2, 56.3 Switch
61.1 Self-holding switch
61.2, 61.3 Reset switch
62 Reset switch
NA Emergency shutdown device
SA Safety shutdown device
58 Relay (safety off)
59 Relay (safety off)

The invention claimed is:

1. Method for the operation of a wind power plant (10), comprising the steps of:
   shutting down the wind power plant (10) after a shutdown signal is triggered by a safety shutdown device (20) that is logically superordinate to an operating control system, and
   releasing the wind power plant (10) for operation after the safety shutdown by means of an operating device (41) that is spatially separated from the wind power plant (10)
   providing a locking device on the wind power plant, wherein upon activation of the locking device a release of the wind power plant by means of the operating device will be or is prevented.

2. Method according to claim 1, wherein after the safety shutdown and before the release of the wind power plant (10) the wind power plant (10) is checked remotely based on predetermined, in particular current, operating data on and/or from the wind power plant (10).

3. Method according to claim 1, wherein the presence of people on or in the wind power plant (10) is checked after and/or during the safety shutdown of the wind power plant (10).

4. Method according to claim 1, wherein the release of the wind power plant (10) is documented.

5. Method according to claim 1, wherein the wind power plant (10) is released for operation after unlocking of a person-related and/or functional-error-related and/or hardware-related, security code.

6. Method according to claim 1, wherein the operating device (41) is notified after and/or during a safety shutdown of the wind power plant (10).

7. Method according to claim 1, wherein the number of releases of the wind power plant (10) will be or is limited within a predetermined period of time.

8. Energy supply system comprising at least one wind power plant (10), wherein an operating device (41) spatially separated from the wind power plant (10) is provided such that by means of the operating device (41) the wind power plant (10) will be or is released for operation after a safety shutdown triggered by a safety shutdown device that is logically superordinate to the operating control system and wherein a locking device is provided on the wind power plant, wherein upon activation of the locking device a release of the wind power plant will be or is locked by means of the operating device.

9. Energy supply system according to claim 8, wherein the locking device is designed as a service switch.

10. Energy supply system according to claim 8, wherein upon activation of the locking device access of the operating device to the reset function of a safety chain and/or a safety system of the wind power plant will be or is blocked.

11. Wind power plant (10), comprising a locking device provided on the wind power plant (10), wherein upon activation of the locking device a release of the wind power plant (10) will be or is blocked by means of an operating device (41) after a safety shutdown triggered by a safety shutdown device that is logically superordinate to an operating control system and wherein a locking device is provided on the wind power plant, wherein upon activation of the locking device a release of the wind power plant will be or is locked by means of the operating device.

12. Wind power plant (11) according to claim 11, wherein the locking device is designed as a service switch.

13. Wind power plant (10) according to claim 11, wherein upon activation of the locking device access of the operating device (41) to the reset function of a safety chain (20) and/or a safety system of the wind power plant (10) will be or is blocked.

14. Wind power plant (10) according to claim 13, wherein after activation of the locking device the operating device for release of the wind power plant (10) is or will be unlocked after entry of a password or transmission of an authorization.

15. Wind power plant (10) according to claim 13, wherein after activation of the locking device the operating device (41) for the release of the wind power plant (10) is or will be unlocked after checking for the presence or absence of people in and/or on the wind power plant (10) and after the determined absence of people.

16. Wind power plant (10) with a safety chain (20) comprising a reset switch (62), which after the triggering of a safety shutdown of the wind power plant (10), by a safety shutdown device that is logically superordinate to an operating control system, will be or is activated or is activatable by means of or in connection with an operating device (41) that is spatially separated from the wind power plant (10) such that the wind power plant (10) is released for operation after the safety shutdown,
   wherein at least one manually activatable switch (46.1, 46.2, 46.3, 47) of an emergency shutdown device (NA) is provided, such that after manual activation of the switch (46.1, 46.2, 46.3, 47) a safety shutdown of the wind power plant (10) is triggered.

17. Wind power plant (10) with a safety chain (20) according to claim 16, wherein at least one switch (56.1, 56.2, 56.3) of a safety shutdown device (SA) that is activatable by a sensor is provided, such that after activation of the switch (56.1, 56.2, 56.3) a safety shutdown of the wind power plant (10) is triggered.

18. Wind power plant (10) with a safety chain (20) according to claim 17, wherein the at least one switch (46.1, 46.2, 46.3, 47) of the emergency shutdown device (NA) and the at least one switch (56.1, 56.2, 56.3) of the safety shutdown device (SA) are series-connected.

19. Wind power plant (10) with a safety chain (20) according to claim 16, wherein in the case of an emergency shutdown by the emergency shutdown device (NA) a release of the wind power plant is or will be blocked by the operating device (41).

20. Wind power plant (10) with a safety chain (20) according to claim 16, wherein in the case of an emergency shutdown by the emergency shutdown device (NA), a rotor of the wind power plant is brought to a standstill by means of, in particular mechanical, brake devices and/or power is disconnected from components.

21. Wind power plant (10) with a safety chain (20) according to claim 17, wherein in the case of a safety shutdown by the safety shutdown device (SA) a rotor of the wind power plant is brought into a low-load mode or state, in particular trundling state, by brake devices.

22. Wind power plant (10) with a safety chain (20) according to claim 16, wherein at least one other reset switch (61.1, 61.2, 61.3) is provided.

23. Wind power plant (10) with a safety chain (20) according to claim 16, wherein several reset switches (61.1, 61.2, 61.3, 62) are connected parallel to each other.

24. Wind power plant (10) with a safety chain (20) according to claim 17, wherein the emergency shutdown device (NA) and/or the safety shutdown device (SA) each have one, in particular two, switch relays (48, 49, 58, 59).

25. Wind power plant (10) with a safety chain (20) according to claim 16, wherein an uninterruptible, power supply (45) is provided.

26. Wind power plant (10) with a safety chain (20) according to claim 16, wherein the safety chain (20) is designed as a wired, in particular hard-wired, switch.

* * * * *

UNITED STATES PATENT AND TRADEMARK OFFICE
CERTIFICATE OF CORRECTION

| | | |
|---|---|---|
| PATENT NO. | : 8,169,097 B2 | |
| APPLICATION NO. | : 12/374348 | |
| DATED | : May 1, 2012 | |
| INVENTOR(S) | : Roland Weitkamp | |

It is certified that error appears in the above-identified patent and that said Letters Patent is hereby corrected as shown below:

Column 14, lines 24 and 25 (claim 11, lines 7 and 8), delete "wherein a locking device is provided on the wind power plant"

Signed and Sealed this
Fourteenth Day of August, 2012

David J. Kappos
*Director of the United States Patent and Trademark Office*